L. L. B. DENIS.
ELASTIC WHEEL.
APPLICATION FILED MAR. 4, 1914.
1,201,567.
Patented Oct. 17, 1916.
3 SHEETS—SHEET 1.
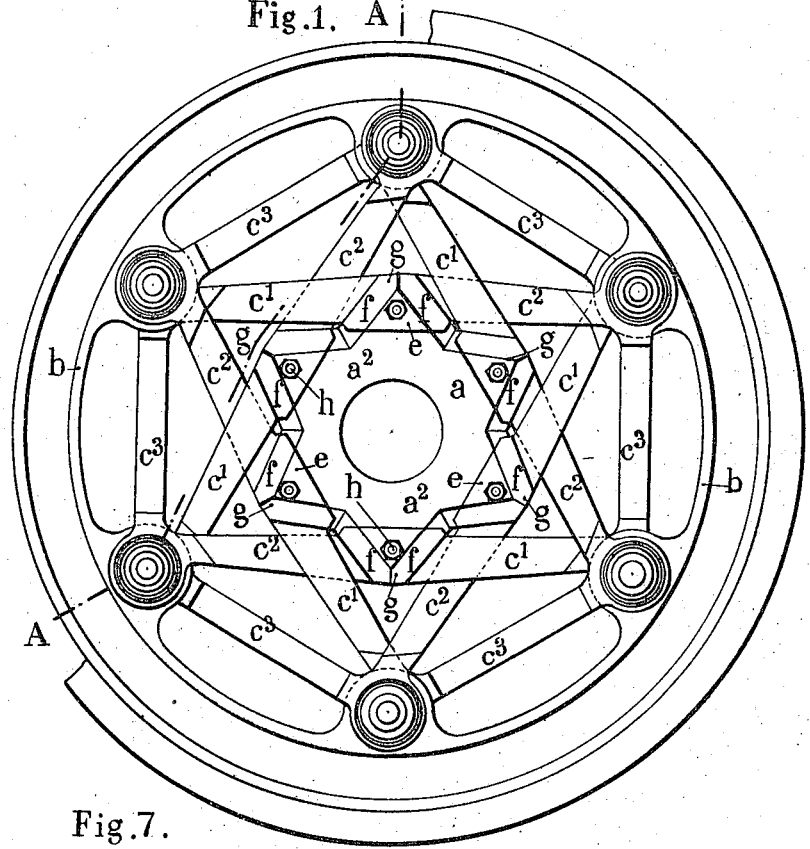
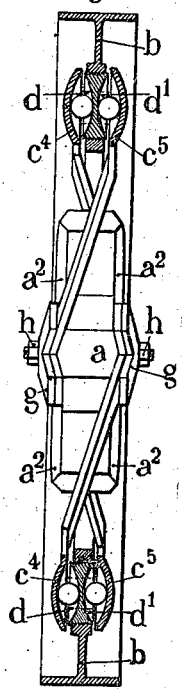
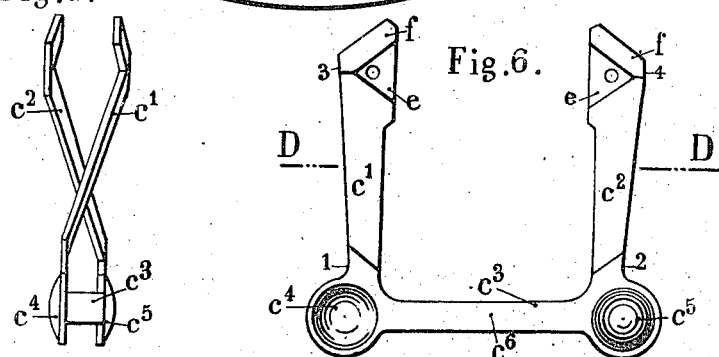
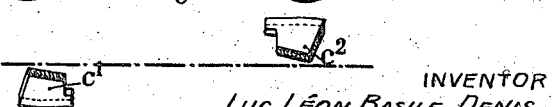
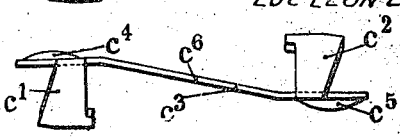
INVENTOR
Luc Léon Basile Denis
WITNESSES
BY
ATTORNEYS L. L. B. DENIS.
ELASTIC WHEEL.
APPLICATION FILED MAR. 4, 1914.
1,201,567.
Patented Oct. 17, 1916.
3 SHEETS—SHEET 2.
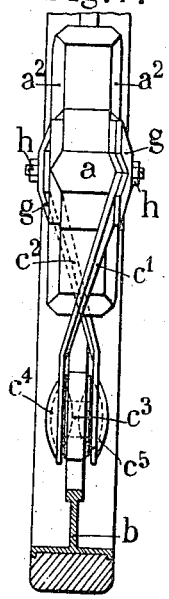
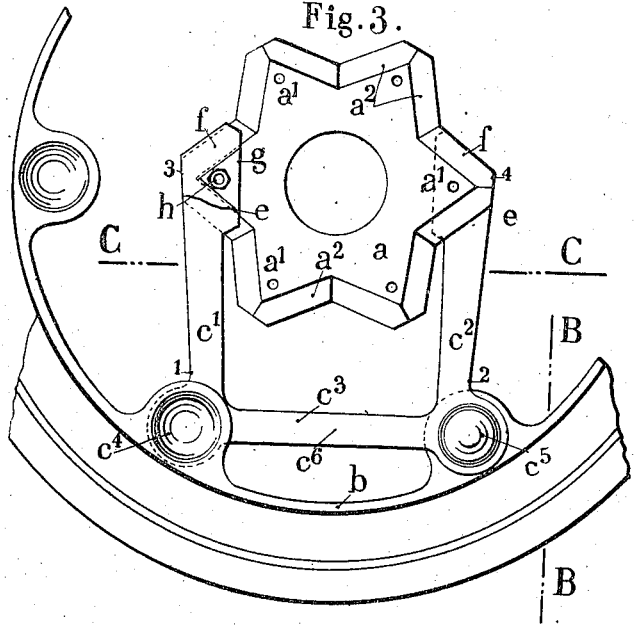
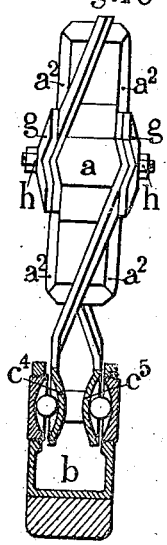
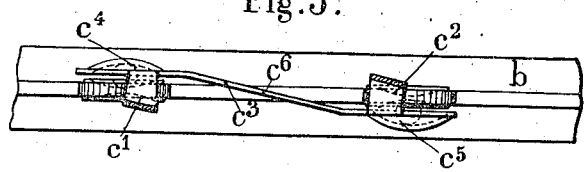
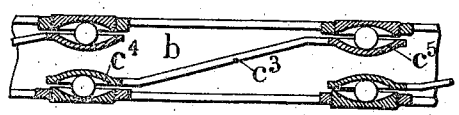
WITNESSES
INVENTOR
LUC LÉON BASILE DENIS
BY
ATTORNEYS

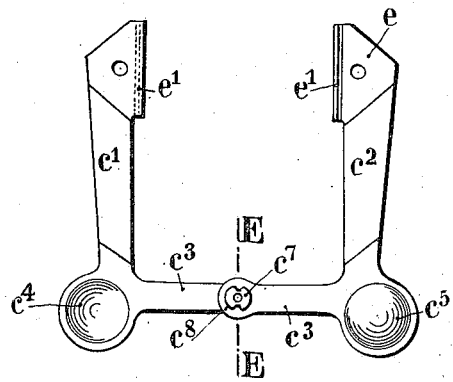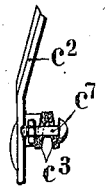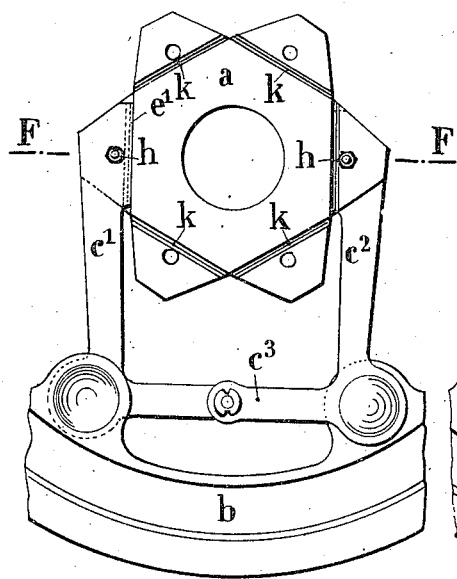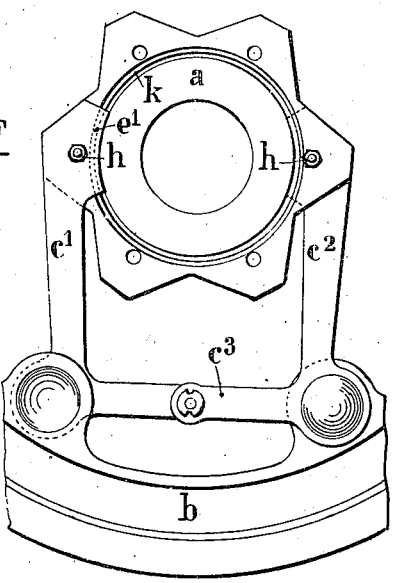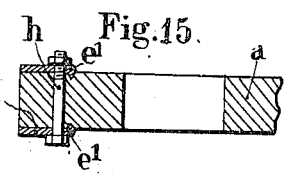

UNITED STATES PATENT OFFICE.

LUC LÉON BASILE DENIS, OF PARIS, FRANCE.

ELASTIC WHEEL.

1,201,567.   Specification of Letters Patent.   Patented Oct. 17, 1916.

Application filed March 4, 1914. Serial No. 822,290.

*To all whom it may concern:*

Be it known that I, Luc Léon Basile Denis, a citizen of the Republic of France, residing at 116–118 Boulevard de Ménilmontant, in the city of Paris, in the Republic of France, have invented a new and useful Improved Elastic Wheel, of which the following is a specification.

This invention has for its object an improved elastic wheel, wherein the connection of the felly to the hub is effected by means of balls interposed between cups or cells provided in the felly and similar cups carried by the hub, these cups being movable laterally and being pressed on to the balls by springs in such a manner that all relative movement of the felly in its own plane, tending to render it eccentric relatively to the hub, leads to a separation of the cups and that the forces producing this eccentricity are transformed into forces directed substantially parallel to the shaft or axle and counterbalanced by springs pressing on the cups carried by the hub.

The invention consists essentially in the special arrangement of the elastic system, which is combined in such a manner as to present certain advantages of construction and to improve the general operation of the wheel.

In my prior and co-pending application Serial No. 413,179, filed January 29th, 1908, (Patent No. 1,107,916, issued August 18, 1914) I disclose certain modifications of the invention herein claimed.

In the accompanying drawings:—Figure 1 shows in elevation one method of constructing the improved wheel. Fig. 2 is a transverse section on the line A, A, Fig. 1. Fig. 3 is a detail view showing in elevation the mounting of one elastic element on the wheel. Fig. 4 shows in section the elastic system mounted on the wheel, the felly being in section on the line B, B, Fig. 3. Fig. 5 is a horizontal section on the line C, C, Fig. 3. Figs. 6 to 9 are detail views showing one form of construction of one of the elements of the elastic system. Fig. 6 shows this element in elevation. Fig. 7 in end view. Fig. 8 in plan, and Fig. 9 in section on the line D, D, Fig. 6. Figs. 10 and 11 are analogous views to those shown in Figs. 4 and 5 and relate to a modification. Fig. 12 shows a modified form of construction of the elastic elements. Fig. 13 is a vertical section on the line E, E, Fig. 12. Fig. 14 shows another method of mounting the elements on the hub. Fig. 15 is a partial section on the line F, F, Fig. 14. Fig. 16 shows a modified form of the method of mounting shown in Fig. 14.

In the improved wheel, the elastic connection between the hub $a$ and the felly $b$ is made by means of elastic elements forming at the same time the springs, the spokes of the wheel, and the laterally movable cups. Each of these elastic elements is formed by a U-shaped piece of metal having two arms $c'$, $c^2$, connected by a transverse piece $c^3$, and having two cups $c^4$, $c^5$ at its two angles. This element may be made by stamping, embossing, bending, etc.

The free ends of the two arms $c'$, $c^2$ are fixed, as will be hereinafter described, on to the two opposite faces respectively of the hub $a$; moreover these arms $c'$, $c^2$ and the transverse piece $c^3$ are inclined and bent in such a manner that the cups $c^4$, $c^5$ corresponding to the arms $c'$, $c^2$ are, relatively to the free ends of the latter, in front of the opposite faces of the felly, that is to say, if the free end of the arm $c'$, is fixed, as in Fig. 4 of the drawing, on the right-hand face of the hub $a$, the cup $c^4$ is in front of the left-hand face of the felly $b$, the cup $c^5$ opposite the right-hand face of the latter, and the free end of the arm $c^2$ in front of the left-hand face of the hub.

The felly $b$ is provided on its two faces with cups or cells $d$, $d'$ (Fig. 2) arranged opposite cups or cells $c^4$, $c^5$ formed on each of the elastic elements.

Every movement tending to render the felly $b$ eccentric relatively to the hub $a$ forces the cups or cells $c^4$, $c^5$ of each elastic element to separate from the corresponding cups or cells $d$, $d'$ of the felly $b$. The cup $c^4$ will move for example toward the left (Figs. 2 and 4); the cup $c^5$ will move toward the right; these movements of the two cups $c^4$, $c^5$ which are equal and of opposite direction, will produce a twisting or warping of the element $c'$, $c^2$, $c^3$, the middle $c^6$ of the transverse piece $c^3$ remaining fixed. This twisting or warping of the elastic element $c'$, $c^2$, $c^3$ causes: 1. A flexure of the arms $c'$, $c^2$ which are mounted on the hub $a$, as will be seen later on, by means of a fixing device forming a boxing. 2. A twisting or warping of these arms $c'$, $c^2$, as well as of the transverse piece $c^3$, this torsion or warping being produced by the general twisting of the element $c'$, $c^2$, $c^3$. This element $c'$, $c^2$, $c^3$ thus forms a spring of high elastic efficiency, since the material is entirely utilized as a spring and all its parts work in torsion. (It will be understood that it is torsional springs which give the most elastic work for the minimum weight of material.)

The number of elastic elements will necessarily be variable according to the dimensions of the wheel and the forces which the latter is to support.

For the purpose of obtaining practical values of the forces and of the necessary strains or bending, the following arrangements have been adopted for the mounting of the improved elastic element above defined. 1. In order that the arms $c'$, $c^2$ may have sufficient flexibility notwithstanding the thickness which they should have in order to resist the forces due to the load and in order to permit the formation of the cells, it is necessary to give them a somewhat great length; for this purpose, these arms instead of being radial are fixed to the hub not at points of division situated on the same radii as the points at which their outer ends engage with the felly, but at adjacent points of division respectively, that is to say, at points of division in front and behind the said points on the felly, as will be seen in Figs. 1 and 3. 2. The arrangement of the elastic element, whereby the ends of each of the arms $c'$, $c^2$ place themselves opposite different faces of the wheel insures the transverse stability of the latter, in such a manner that the bending, under a lateral force, may be as little as possible notwithstanding the individual displacement of each of the cups or cells.

When a transverse force, that is to say a force perpendicular to the median plane of the wheel, is exerted on the latter, the ends 1, 2 of the arms $c'$, $c^2$ adjacent to the cups $c^4$, $c^5$ should move together by approximately equal amounts and in the same direction. On the other hand, in the normal movement, under a vertical force and by the play of the balls, these same ends of the arms $c'$, $c^2$ move equal amounts, but in opposite directions. It is in order to oppose the first movement, which is simultaneous and in the same direction, of the ends 1, 2 of the arms $c'$, $c^2$, while permitting the second movement, which is simultaneous and in the opposite direction of the arms, that the ends 3, 4, of these arms are in different planes; under these conditions this movement, which is simultaneous and in the same direction, of the ends 1, 2 is only possible if the elastic element is deformed as it stands, that is to say, with variation of the angles 3, 1, 2 and 4, 2, 1 at the same time causing the arms $c'$, $c^2$ to turn about their points of attachment to the hub $a$. For the purpose of preventing this rotation, the improved arrangement comprises a securing device or anchorage which will be hereinafter described. On the other hand the simultaneous movement in the opposite direction of the ends 1, 2 of the arms $c'$, $c^2$ should always be possible by flexure on the flat alone; this result is obtained by arranging the arms $c'$, $c^2$ respectively in two different planes, as shown in Figs. 5, 8 and 9, and passing through the point $c^6$ arranged in the middle of the transverse piece $c^3$. Moreover, as shown in Figs. 5 and 9, the transverse sections of the arms $c'$, $c^2$ stand obliquely relatively to the direction of the lateral forces exerted on the wheel, and thus oppose to a certain degree the flexure of these arms.

The elastic elements, instead of being formed by a single piece of metal, can also be each formed of two symmetrical pieces, connected at the level of the middle part $c^6$ of the transverse piece $c^3$ by the aid of a bolt $c^7$, as shown in Fig. 12. Each of these half elements thus has at $c^6$ in the direction of its width an expansion $c^8$ having a hole for the passage of the assembling bolt.

It is possible thus to be able to cut the piece $c^3$ of each element in its median part, without changing its fundamental properties, for the middle point of the element is, by reason of symmetry, a point of inflexion. The cross piece $c^3$ is not subjected at this point to any bending force, but only to sliding forces or disconnecting forces and to a torsion couple, to which there is opposed in a sufficiently efficacious manner the single tightening bolt $c^7$. This arrangement of the elastic elements facilitates their manufacture as well as their mounting on the wheel, each half element being easily removed and replaced, even when the wheel is fitted to a vehicle without it being necessary to touch the other pieces. On the other hand, it is possible by suitably twisting the bars forming the transverse piece $c^3$ to give them, by reason of the tightening effected by the bolt $c^7$, a supplementary tension which enables the tensions to which the arms $c'$ and $c^2$ are subjected to be diminished toward their point of attachment to the hub $a$. Fig. 13 shows this twisting or warping of the bars and how the ends of the two half elements appear before the complete tightening of the connecting bolt $c^7$.

The securing or anchorage of each of the elastic elements on the hub $a$ can be effected in the following manner:—Each of the arms $c'$, $c^2$ is provided at its free end with a flat bearing surface $e$ arranged in a plane parallel to the median plane of the wheel. This flat bearing surface is of triangular form and is extended by a piece $f$ which is slightly bent and, for reasons of symmetry, has the same inclination relatively to the plane of this bearing surface, as the plane of the arm $c'$ or $c^2$.

The hub $a$ of the wheel is shaped, as shown in Figs. 1 to 4, in such a manner as to have a flat part $a'$ and inclined surfaces $a^2$, on which are fitted the ends of the arms $c'$, $c^2$ of each elastic element. A cover-plate $g$, suitably bent, covers the ends of the arms $c'$, $c^2$ of the several elastic elements on each face of the hub and holds them on to the hub. Bolts $h$ secure these cover-plates together with the elastic elements on the hub. By this arrangement, each elastic element is fixed on the hub by a kind of casing, which resists every movement of rotation of this element. It is obvious that this fixing device can be replaced by any other suitable arrangement, capable of securing the ends of the arms $c'$, $c^2$ of the various elastic elements on to the hub. For example this fixing device can be combined in the manner shown in Figs. 11 to 16. In this arrangement, the flat bearing piece $e$ extends over the whole surface of the end of each arm of the element. The oblique part $f$ is dispensed with, but the inner border of the bearing piece is bent at right angles, in such a manner as to form a flange or tongue $e'$. This tongue is then shaped by tooling in such a manner as to have a contact surface in the form of an inverted V or a double bevel and is designed to engage in a groove $k$ of corresponding form on one of the faces of the hub $a$. These tongues $e'$ can be straight, as shown in Fig. 14, in which case the grooves $k$ form a regular polygon on the two faces of the hub. These tongues can also be curved and they then fit into a circular groove on each side of the hub, as shown in Fig. 16. This method of fixing enables the cover-plates $g$ to be dispensed with, the tongues forming a reinforcement enabling the bolts $h$ to be firmly tightened up without the interposition of any other piece. On the other hand after the tongues $e'$ have been bent hot, they can be finished by tooling to any degree of accuracy desired.

Figs. 10 and 11 show in vertical section and in horizontal section a modification of my improved wheel, wherein the cells $d$, $d$ are carried by the felly $b$. These cells, instead of having two faces and being arranged on a central web of the felly, are arranged on the two sides of the felly and have a simple concavity turned toward the interior. The elastic system is then included between these two rows of cells placed face to face. This modification is applicable to the methods of construction and fixing of the elastic elements described above.

It has been specified above that the cells $c^4$, $c^5$ are formed in the metal by stamping, embossing, etc., but these cells can also be assembled and fixed by any suitable means, even by screwing, by reason of the thickness of the metal, in a manner analogous to that shown for the cells on the felly.

What I claim is:—

1. In a spring wheel, a series of elements each in the form of a U presenting two parallel branches and a connecting portion at one of the extremities of said branches, each branch having a plain surface at the free extremity thereof engaging with the hub, and means for binding the elements to the felly of the wheel and permitting relative, radial and circumferential movement.

2. In a spring wheel, a series of elements each in the form of a U presenting two branches, and a connecting portion at one of the extremities of said branches, each branch having a plain surface at the free extremity thereof for engagement with the hub of the wheel, a bolt uniting the plain surface of each branch of the hub, and a co-acting key and groove connection for preventing turning of said surface about said bolt.

3. In a spring wheel, a series of elements each in the form of a U presenting two branches extending from the rim to the hub and a connecting portion at the rim ends each branch at its opposite end having a surface engaging with the hub of the wheel, a bolt uniting each surface to the hub, a flange at the extremity of each surface, a groove arranged in the hub to receive these flanges, and ball connections between said elements and the felly at each angle of the elements.

4. In a spring wheel, a series of elements extending from the rim to the hub, each element having one plain surface at one extremity engaging with the hub of the wheel, a bolt uniting the plain surface of each element to the hub, a flange at an angle to the plain surface, a groove in the hub to receive these flanges, a cup at the outer end of the elements, a second cup on the rim opposite the first mentioned and balls placed between the cups.

5. In a spring wheel, a series of elements in the form of a U presenting two parallel branches, and a connecting portion uniting the latter, means for connecting the extremities of the branches to opposite sides of the hub and rolling contact members between each element at its angles and the rim.

6. In a spring wheel, a series of elements each in the form of a U presenting two parallel branches and a connecting portion, means for connecting the free extremities of the branches to opposite sides of the hub, and means for connecting the separate angles of each element to opposite sides of the rim.

7. In a spring wheel, a series of elements each in the form of a U presenting two branches and a transverse portion for the outer extremities of the branches, surfaces at the free extremity of each branch for engagement with the hub at spaced points, a ball at each angle of each element and disposed between the element and the rim, the two balls for each element being on opposite sides of the rim and at spaced points.

8. In a spring wheel, a series of elements in the form of a U, including side branches and a connecting portion, two concentric members, one constituting a rim and the other a hub, means for securing the free extremities of each element to one member at axially and circumferentially spaced points and means for connecting the angles of each element to the other member at axially and circumferentially spaced points.

9. A spring wheel including a rim portion, a hub portion, a series of elements each in the form of a U and each having two branches extending from said rim portion to said hub portion, and a connecting branch extending along said rim portion, two cups secured to said connecting branch, one at each end and the two facing in opposite directions, opposed cups carried by said rim portion and a ball disposed between the two cups of each opposed pair.

10. A spring wheel including a rim portion, a hub portion, a series of elements each in the form of a U and each having two branches extending from said rim portion to said hub portion, a connecting branch extending along said rim portion, and means interposed between said connecting branch and said rim portion for permitting limited relative, radial and circumferential movement, the means at one end of said connecting branch being upon one side thereof and the means at the opposite end of said connecting branch being at the opposite side thereof.

11. In an elastic wheel, a hub, resilient spokes secured to the hub, a rim movable relatively to the spokes, and means to give torsion to the spokes by a relative movement of the rim.

12. In an elastic wheel, a hub, a plurality of separate resilient spokes secured to the hub, a rim capable of movement relatively to the spokes, and interposed elements between the spokes and rim to place the spokes under tension by a relative movement of the rim.

13. In an elastic wheel, a hub, a rim, a plurality of separate resilient spokes secured to the hub and formed with cups disposed at opposite sides of the rim, and balls in said cups.

14. In an elastic wheel, a hub, a rim and intermediate resilient elements secured to the hub, said elements presenting spoke arms in pairs, the outer ends of which arms are disposed at opposite sides of the rim, and means between the rim and the inner faces of the arms to place said arms under tension by a relative movement of the rim.

Signed by me this 17th day of February, 1914.

LUC LÉON BASILE DENIS.

Witnesses:
HANSON C. COXE,
RENÉ THIRIOT.